United States Patent [19]

Coronel

[11] Patent Number: 5,718,652
[45] Date of Patent: Feb. 17, 1998

[54] CORONEL EFFECT POSITIVELY INFINITELY VARIABLE ROTARY MOTION TRANSMISSION

[76] Inventor: Paul Kay Coronel, c/o Noreen L. Chun, 3840 Claudine St., Honolulu, Hi. 96816

[21] Appl. No.: 321,722

[22] Filed: Oct. 12, 1994

[51] Int. Cl.$^6$ .................................................. F16H 35/02
[52] U.S. Cl. ...................... 475/169; 74/393; 74/396; 475/170
[58] Field of Search .................. 74/318, 320, 393, 74/396, 417, 68, 69, 392; 475/169, 170, 334

[56] References Cited

U.S. PATENT DOCUMENTS

| | | | |
|---|---|---|---|
| 1,674,355 | 6/1928 | Curran | 475/169 X |
| 1,691,644 | 11/1928 | Curran | 475/169 X |
| 2,012,629 | 8/1935 | Huppmann | 475/170 X |
| 2,144,110 | 1/1939 | Herrick | 475/169 |
| 2,785,590 | 3/1957 | Sundt | 475/169 X |
| 2,844,051 | 7/1958 | Cascajares | 475/172 X |
| 2,953,944 | 9/1960 | Sundt | 475/169 X |
| 3,779,090 | 12/1973 | Ostenberg et al. | 475/301 X |
| 3,994,186 | 11/1976 | Anderson | 475/301 X |
| 4,050,324 | 9/1977 | Teyssandier | 74/393 X |
| 4,090,416 | 5/1978 | Hicks | 475/317 X |
| 4,497,221 | 2/1985 | Koser | 475/169 X |
| 4,700,589 | 10/1987 | Coronel | 74/705 |
| 4,807,494 | 2/1989 | Lew | 475/169 X |
| 4,994,004 | 2/1991 | Meijer et al. | 475/149 |
| 5,266,068 | 11/1993 | Benthim | 475/301 |
| 5,352,162 | 10/1994 | Coronel | 475/169 |
| 5,507,701 | 4/1996 | Benesch | 475/169 |

*Primary Examiner*—Charles A. Marmor
*Assistant Examiner*—Peter Kwon

[57] ABSTRACT

The principle of the Coronel Effect resulting from an individual gear simultaneously producing two individually controllable driving functions motivating a second engaged driven gear is described. This principle is incorporated within the Coronel Effect Positively Infinitely Variable (CEPIV) transmission, a true all-geared torque converting positively infinitely variable rotary motion transmission incorporating a user-actuated independent input control to continuously infinitely varies the transmission output between a geared-neutral configuration and full-speed output. The input control varys the tilt angle of a CE drive gear to vary: (1) the degree of CE drive gear circumrevolving production of the Coronel effect counterrotation of an engaged output receiving gear, and (2) the extent of output receiving gear orbiting of the mechanism central axis. The concurrent rotational speed of the CE drive gear is utilized to neutralize the Coronel effect and produce the geared-neutral configuration. User-actuated reduction of the CE drive gear's tilt angle produces a continuously variable reduction of the Coronel effect. This cancels the geared-neutral configuration to produce continuously infinitely variable torque converting transmission output through the output receiving gear as it orbits into the slower revolving CE drive gear. Transmission products are transferred to the output shaft through a telescoping shaft or an optional geared rotary driver. A simple integrated, torque converting, output reversing capability without additional mechanical components may be designed into the transmission.

19 Claims, 2 Drawing Sheets

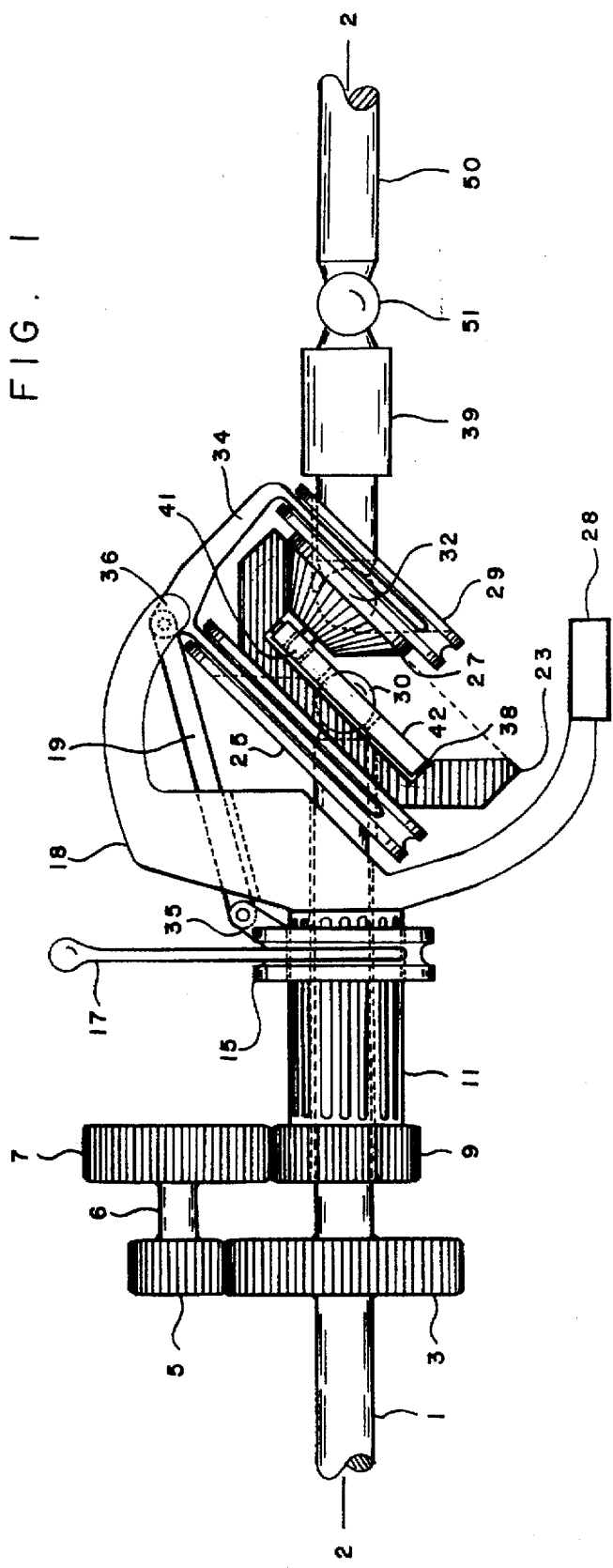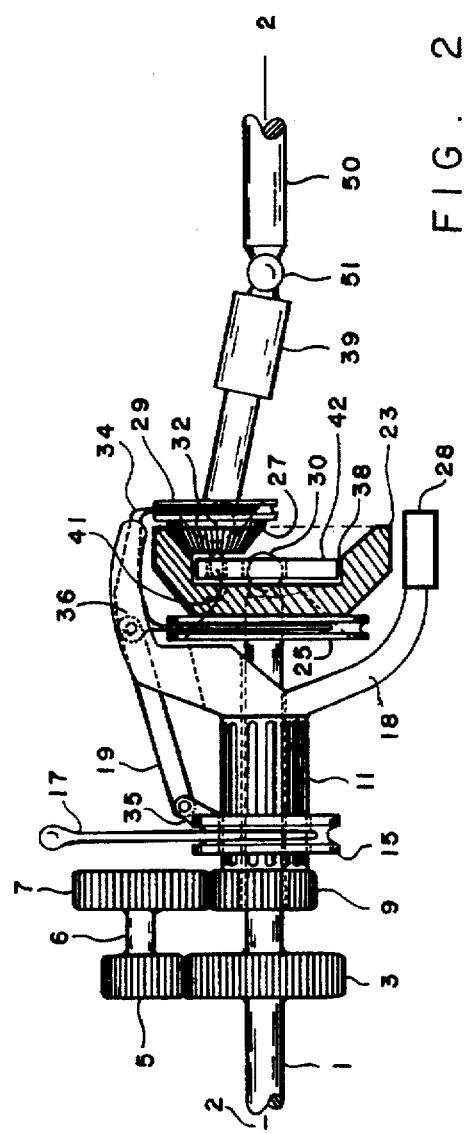

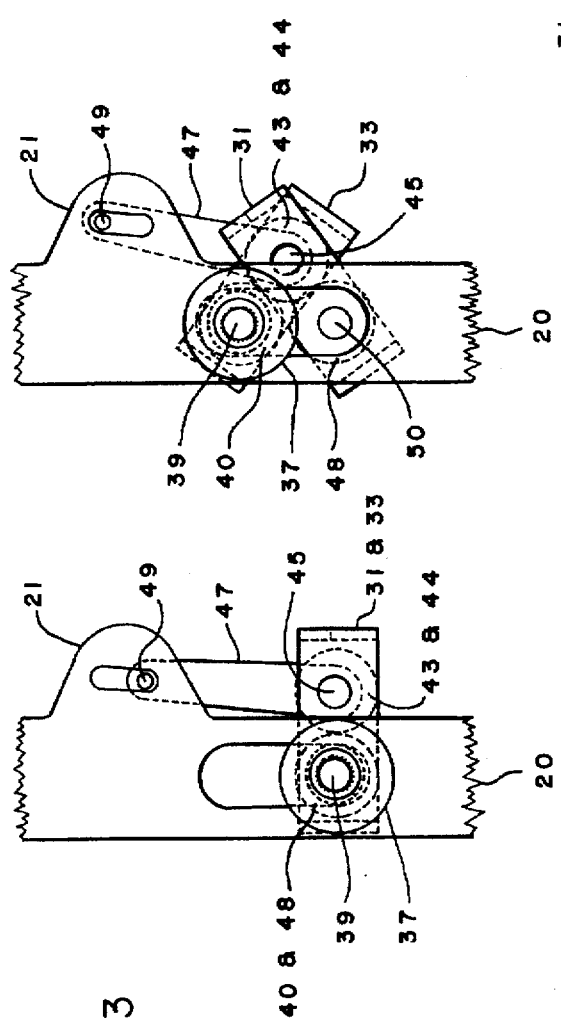
FIG. 3
FIG. 4
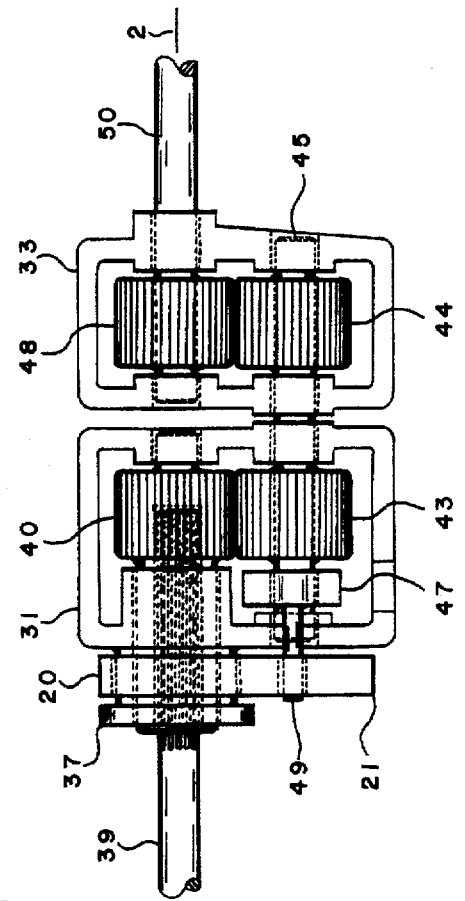
FIG. 5
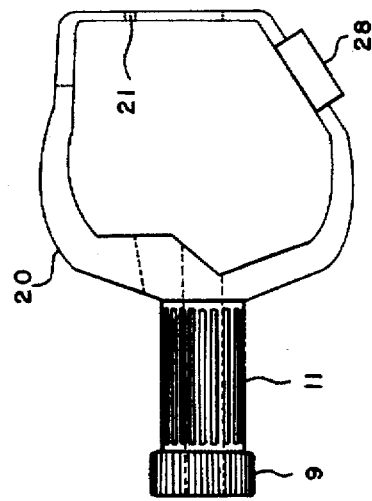
FIG. 6

CORONEL EFFECT POSITIVELY INFINITELY VARIABLE ROTARY MOTION TRANSMISSION

TECHNICAL FIELD

This disclosure relates to the transmission of angular velocity, specifically to its mechanical transmission through the use of an individual gear simultaneously producing two individually controllable driving functions motivating a second engaged driven gear, and the application of this principle to produce an all-geared torque converting, continuously engaged positively infinitely variable (PIV) transmission. This disclosure further relates to PIV transmissions utilizing tilting drive gears to produce the variable Coronel Effect (CE) generating a variable output range between geared-neutral and full speed output.

BACKGROUND ART

The modern need for rotary motion transmission devices originated with the introduction of internal combustion engines producing narrow ranges of high power output. Two forms of transmissions appeared: (1) continuously infinitely variable traction devices, and (2) geared multiple-ratio shifting mechanisms. Both forms experienced serious limitations.

Multiple-ratio gear boxes require clutching mechanisms to interrupt drive continuity during ratio shifting. Therefore, these mechanisms must incorporate friction clutches or fluid torque converters which have limited life spans, waste generated energy, and are mechanically complex.

Infinitely variable devices are preferable since they are capable of being varied to the exact desired ratio. Therefore, efforts have continued to perfect these. Initial efforts included a wide variety of friction traction devices utilizing wheels sliding across disks or cones. Limitations of these devices included rapid wear and limited traction producing short mechanism life-spans.

Attempts have been made to overcome these limitations through replacing the sources of friction with mechanisms to duplicate their functions:

U.S. Pat. No. 4,700,589 introduced all-geared exponential angular velocity multiplication. Changes in motor speeds actuated exponential changed in output speeds. A limitation of this design is the ability of the user to independently separate and vary the motor speed from the transmission output speed.

U.S. Pat. No. 4,983,151 (Pires, 1991) was issued for the infinitely variable transmission. This invention repositions a variable positionable index plate to introduce variable motion pulses to modify angular velocity transiting from a geared-neutral position. A limitation of this device is its use of one-way rachets in overrunning gears with the inherent inability to completely eliminate the resulting rotational and torque pulses. This places torque limitations upon its operational capability where too much torque will result in mechanical damage.

U.S. Pat. No. 5,133,712 (Economou) shows a crank type stepless transmission requiring rachet type overrunning clutches to convert pulsed motion into circular output motion.

These efforts fall as they attempt to mimic with mechanical complexity a continuously variable ratio geared device rather than induce a gear set to infinitely vary its output.

U.S. Pat. No. 5,352,162 (Coronel, October 1994) the first true positively infinitely variable transmission, utilizes dual concentric gearing to produce a variable speed range between geared-neutral and full speed output configurations.

DISCLOSURE OF THE INVENTION

Introduction

The purpose of this disclosure is to describe the Coronel Effect Positively Infinitely Variable (CEPIV) transmission operational principle and its application within the disclosed the mechanical rotary motion transmissions.

The CEPIV is a true all-geared torque converting positively infinitely variable transmission which utilizes a user-actuated independent input control to continuously and infinitely vary the transmission output.

The input control changes the effective ratio between a larger tilting and rotating Coronel effect (CE) driving gear and a smaller driven output receiving driven pinion gear. The ratio is changed by physically varying the degree of "circumrevolving" of the CE driving gear to: (1) cancel the pinion gear's direct rotation to establish the geared-neutral configuration, and (2) vary the degree of output receiving gear orbital repositioning relative to the mechanism's central axis. This produces an output receiving gear and attached output shaft torque converting speed range operating between a geared-neutral stopped position and its maximum output speed.

No secondary rotational motion injection or extraction is required to actuate the mechanism and no friction clutch of torque converter mechanisms are necessary to couple the transmission to the drive train.

Also disclosed is an optional geared rotary driver for attachment to the CEPIV transmission which transfers concurrently rotating and orbiting CEPIV output products from the transmission to the output shaft. While the geared rotary driver components orbit the central axis during mechanism operation, only actual output receiving gear rotational products are transferred to the output shaft.

This disclosure further describes the construction, operation and advantages of the Coronel effect principle and various configurations of the invention. The preferred embodiment is shown in FIG. 1 in its geared-neutral output configuration.

This disclosure does not include CEPIV transmission reverse gearing as many simple reversing mechanisms are well known and easily attached to the output shaft. Additionally, in some applications, it may be desirable to locate the reverse gearing in a location other than adjacent to the transmission.

This disclosure does provide the capability for the CEPIV transmission to be designed with a simple, integrated, reversing capability without additional mechanical components. This is accomplished with modifying the CEPIV design so the geared-neutral configuration occurs at a partial tilt (rather than the full tilt) of the CE drive gear. Appropriately modified CEPIV conditioning gear ratios establish this configuration. As the CE drive gear is tilted beyond this geared-neutral position the output receiving gear speed, as driven by the Coronel effect, exceeds the rotational speed of the CE drive gear producing opposite or reverse direction output receiving gear rotation. This produces a progressively accelerating, torque converting, reverse direction output receiving gear rotation. This will eliminate the necessity for a separate reverse gear box incorporated into the drive train and produce a bidirectional, torque converting transmission.

The Principle of Coronel Effect

The "Coronel effect" is that rotational product created when non-rotating circumrevolving motions induce a tiltable concave beveled drive gear to counterrotate an engaged output receiving pinion gear.

The term "circumrevolving" is defined as travel of the angle of the drive gear around the central axis independently of the drive gear's rotation.

Functionally, the circumrevolution of a driver gear around an identically sized driven gear will induce no driven gear rotation. Since the circumference of the CEPIV's larger driving gear is greater than that of the smaller driven output receiving gear, the circumrevolving transit of the engaged non-rotating larger diameter gear around the smaller diameter gear transmits the difference between the diameters as the "Coronel Effect" driven rotation.

during operation of the CEPIV, concurrent rotation of the CE drive gear in a direction opposite to the Coronel effect cancels the Coronel effect to achieve the transmission's geared-neutral configuration.

User-actuated reduction of the CE drive gear tilt angle towards a perpendicular relationship with the central axis reduces the amount of Coronel effect generated. Reduction of the CE drive gear tilt angle concurrently initiates orbiting of the output receiving gear around the mechanism central axis into the slower revolving CE drive gear to produce a reduced degree of circumrevolving. This reduced circumrevolving cancels the geared-neutral configuration and actuates a user controllable range of continuous infinite variation of the transmission output between the geared-neutral configuration and its full output speed.

In practice, the engine output shaft is attached to the CEPIV transmission's input shaft. Engine speed revolves the CE drive gear through a constant velocity universal joint. A set of conditioning gears with preset ratios are connected to the orbital driver which circumrevolves the CE drive gear faster than the CE drive gear's rotational speed. This induces rotation in the output receiving gear in an opposite direction. The counterrotation of the output receiving gear is next cancelled by the CE drive gear's rotation, producing the geared-neutral configuration. At this geared-neutral configuration, no actual mechanism output is produced and no veritable engine torque is exhausted.

Movement of the control fork changes of CE drive gear's angle through the actuating linkage from full angular tilt to a perpendicular relationship to the central axis. This initiates: (1) orbiting of the output receiving gear around the mechanism central axis with progressively enlarging concentric circles, and (2) a reduction of the Coronel effect upon the output receiving gear. As the reduction of the Coronel Effect reduces the amount of rotation cancellation generated by of the CE drive gear, the output receiving gear is now induced to initiate output rotation in an opposite direction from the CE drive gear.

The orbital speed of the output receiving gear is identical to the circumrevolving speed (not the rotational speed) of the CE drive gear in order to maintain engaged driving of the output receiving gear. Progressive decreases of the CE drive gear's angle towards it's perpendicular relationship with the central axis produce increases of output receiving gear orbiting, further reductions of the generated Coronel effect, and increases in the speed of the output receiving gear.

Full output speed is obtained when the angle of the CE drive gear is reduced to a position perpendicular to the central axis where it generates no circumrevolving producing zero Coronel effect. The large concentric orbits of the output receiving gear driving it into the slower rotating CE drive gear produce the maximum transmission output speed. These rotational products and the accompanying engine torque are transmitted to the output shaft through the universally positionable connecting linkage.

Thus, when the rotational speed of the output receiving gear as driven by the CE drive gear's Coronel effect equals the CE drive gear's rotational speed, geared-neutral is the result. This is because the Coronel effect cancels the output receiving gear's CE drive gear driven rotation at geared-neutral. Variable Coronel effect generated between the CE drive gear's zero tilt angle and the geared-neutral tilt angle produce continuously and infinitely variable forward rotational direction of the output receiving gear. Further increases of the CE drive gear's tilt angle cause the output receiving gear speed, as driven by the Coronel effect, to exceed the rotational speed of the CE drive gear. This generates an opposite reversed output receiving gear rotation direction. The utilization of conditioning gear ratios to set the CE drive gear's geared-neutral configuration at partial tilt rather than full tilt will produce a bidirectional, torque converting, Coronel effect positively infinitely variable transmission.

The principle has been recited above with respect to a particular preferred embodiment. However, it will be appreciated by those skilled in the art that many modifications and variations can be made without departing from the principle and scope of the invention. Some of these modifications and variations are set forth in the ensuing detailed descriptions.

OBJECTIVES OF THE INVENTION

The objectives of the mechanisms include the mechanical inception of the following advantages:

1. An individual gear simultaneously producing two individually controllable driving functions motivating a second engaged driven gear.

2. An all-geared transmission permanently coupled to the driving motor without the requirement for friction inducing ablative clutches or fluid torque converting devices.

3. A transmission capable of maintaining a geared-neutral output stopped position as well as initializing torque converting output drive actuation with any motor input speed.

4. A transmission which provides user-actuated infinitely varying output from its geared-neutral stopped position without any drive line disengagement and individual gear ratio shifting. The infinitely varying capability further inherently provides the effects of conventional low geared and overdrive operations.

5. A transmission which provides infinitely varying motor compression brakeing from any speed to the vehicular or machine stopped position.

6. A transmission which increases the efficiency of the transfer of power from the motor to vehicle wheels to increase fuel conservation and decrease pollution.

7. A positively infinitely variable transmission which is actuated without injections or extractions of rotary motion.

8. A positively infinitely variable transmission utilizing the Coronel effect principle to reduce the mechanical complexity of the mechanism.

9. A Positively infinitely variable transmission which eliminates the need for an input side universally positionable connecting linkage to reduce the length of the transmission.

10. A Coronel effect positively infinitely variable transmission with an optional integrated geared rotary driver to eliminate the necessity for a telescoping output shaft to reduce the overall length of the transmission unit.

11. A positively infinitely variable transmission which is a smaller, lighter, simpler, and cheaper machine which does the work of a much larger, heavier, more complicated and expensive transmission.

12. A bidirectional, torque converting, Coronel effect positively infinitely variable transmission with an integrated, torque converting, reversing capability occurring as the drive gear tilts beyond a partially tilted geared-neutral configuration and the output receiving gear speed, as driven by the Coronel effect, exceeds the rotational speed of the CE drive gear.

BRIEF DESCRIPTION OF THE DRAWINGS

The Drawing Figures

FIG. 1 shows a side view of the Coronel Effect Positively Infinitely Variable (CEPIV) transmission including the user-operated actuator and the output universally positionable connecting linkage comprising a telescoping shaft connecting the transmission to the output shaft.

FIG. 2 shows a side view of the CEPIV drive gear output receiving gear and related components within their high-speed output configuration.

FIG. 3 shows a frontal view of the optional geared rotary driver output universally positionable connecting linkage utilizing orbiting gearing to transfer CEPIV transmission rotational products to the mechanism output shaft. The geared rotary driver is depicted in it's geared-neutral operational configuration.

FIG. 4 shows a frontal view of the geared rotary driver depicted in its fully output speed operational configuration.

FIG. 5 shows a top view of the geared rotary driver, connected to the driver arm, and depicted it its geared-neutral operational configuration.

FIG. 6 shows a side view of the driver arm attached to the driver shaft and modified for use with the geared rotary driver. This driver arm completely encircles the Coronel effect gearing for variable supportative orbital repositioning of the geared rotary driver.

Brief Description of the Numbered Parts Within the Drawing Figures

1. Input Shaft
2. Mechanism Central Axis
3. Input Transfer Gear
5. Input Receiving Gear
6. Connecting shaft
7. Transfer Gear
9. Driver Gear
11. Driver Shaft
15. Sliding Actuator
16. CV Universal Joint
17. Control Fork
18. Driver Arm
19. Actuating Linkage
20. Driver Arm
21. Angular Extension
23. Coronel Effect Drive Gear
24. Coronel Effect Actuator
27. Output Receiving Gear
28. Counterweight
29. Aligner Bearing
30. CV Universal Joint
31. Alignment Frame
32. CV Universal Joint
33. Alignment Frame
34. Orbital Driver
35. Pivot Mount
36. Pivot Mount
37. Alignment Support -continued 38. Bearings
39. Telescoping Transfer Shaft
40. Transfer Gear
41. Pinion Alignment Shaft
42. Support
43. Idler Gear
44. Idler Gear
45. Idler Shaft
46. Support
47. Orbital Driver Arm
48. Output Transfer Gear
49. Pivot Pin
50. Output Shaft
51. CV Universal Joint

MODES FOR CARRYING OUT THE INVENTION

Construction of the Invention

Transmission

During construction of the Coronel effect positively infinitely variable (CEPIV) transmission of FIG. 1, the input shaft 1 is positioned at the mechanism central axis 2 and journaled through supporting framework with its first end fixed to a driving motor output shaft. Input transfer gear 3 is attached to input shaft 1. The second end of the input shaft 1 is attached to the Coronel effect (CE) concave beveled drive gear 23 through constant velocity universal joint 30. The centrally bored CE actuator 25 is attached to the back of CE drive gear 23 and concurrently rotates and pivots with CE drive gear 23 repositioning.

The centrally bored driver shaft 11 is journaled to rotate around input shaft 1 upon optional bearings with driver gear 9 attached to its first end, and spline grooves cut longitudinally upon its exterior circumference.

Connecting shaft 6 is journaled through adjacent framework for supportative rotation. Input receiving gear 5 is attached to the first end of connecting shaft 6 and connected in a driven relation with the input transfer gear 3. Transfer gear 7 is attached to the second end of connecting shaft 6 and connected in a driving relation with driver gear 9.

Driver shaft 11 is journaled through the centrally bored sliding actuator 15. Sliding actuator 15 possesses a groove cut within its central external circumference, and is constructed with internal longitudinal splines for sliding between the driver shaft 11 splines. Support pivot mount 35 is attached to one side edge to revolve with sliding actuator 15 during driven rotation.

The first end of control fork 17 slides within the sliding actuator 15 circumferential groove and its second end comprises the actuation handle for user-operation of the transmission. The manually actuated control fork 17 depicted in FIG. 1 may be replaced with optional servo-mechanical, electrically, or hydraulically actuated unit (not shown).

Orbital driver 34 comprises an actuating arm including a driver fork (or ring) sliding within the CE actuator 25 groove and a pivot mount 36 attached to the first arm end, a driver fork (or ring) revolving within a groove of aligner bearing 29 (on the rear of the output receiving gear 27) attached on the second arm end. Actuator linkage 19 is attached to the sliding actuator 15 pivot mount 35 on its first end, and the orbital driver pivot mount 36 on its second end. Centrally bored driver arm 18 is attached to the second end of driver shaft 11 and is constructed with a vertically milled slot through its upper arm for support and driving of the orbital driver 34 and attached actuator linkage 19 during all phases of their operational orbiting repositioning. Counterweight 28 is attached to the bottom arm of orbital driver 18 to counterbalance the transmission and telescoping transfer shaft 39 during operation.

The concave beveled CE drive gear 23 has an angled ring of gear teeth cut upon the inward angled rim surrounding a recessed central face. Aligner disk 42 is centrally bored for CV universal joint 30, freely rotates within the recessed face upon bearings 38, and has a bearing bore for alignment shaft 41 drilled through the disk and positioned near one edge.

Alignment shaft 41 extends from the center of the output receiving gear 27 and is journaled through the bearing bore of aligner disk 42. The bear teeth of the output receiving gear 27 mesh with the ring of teeth of the CE drive gear 23. Alignment between the CE drive gear 23 and the output receiving gear 27 is maintained by the alignment shaft 41 and the orbital driver 34 during all operational phases. The first end of telescoping shaft 39 is connected to the output receiving gear 27 through the CV universal joint 32. The second end of telescoping shaft 39 is connected to the output shaft 50 through the CV universal joint 51.

Geared Rotary Driver

The optional geared rotary driver of FIGS. 3, 4 and 5 is a separate output universally positionable connecting linkage mechanism attached to the CEPIV transmission for transferring transmission output products to the output shaft 50 to replace the telescoping shaft 39 and reduce the overall length of the CEPIV unit.

During construction of the geared rotary driver of FIGS. 3, 4 and 5, the driver arm 18 is replaced by driver arm 20 of FIG. 6 which completely encircles Coronel effect gearing 23 & 27. The end of driver arm 20 is laterally milled with a slot for supportive repositioning attachment of alignment support 37 and its journaled telescoping transfer shaft 39. An angular extension 21 depends from an end side of driver arm 20 with a slot for orbital repositionable driving of the pivot pin 49 attached to orbital driver arm 47. Counterweight 28 is attached to the bottom of driver arm 20 to counterbalance the transmission with the geared rotary driver during operation.

The alignment support 37 is attached to and shares a contiguous central bore with the upper first side of the first alignment frame 31. The contiguous bore is in alignment with a bearing bore through the upper second side of the first alignment frame 31. Telescoping transfer shaft 39 is journaled through the two upper bearing bores. Transfer gear 40 is attached to the telescoping transfer shaft 39 and positioned between the first and second upper sides of the first alignment frame 31.

First alignment frame 31 contains two additional bearing bores, each positioned in alignment on the lower first and second sides. The first half of idler shaft 45 is journaled through the lower bearing bores with idler gear 43 attached to it, positioned between the two alignment frame 31 sides, and connected in a driven relation with the transfer gear 40.

Orbital driver arm 47 includes a first end with a bearing bore and a second end with pivot pin 49 extending laterally from one side, parallel to the bearing bore. Idler shaft 45 is journaled through the bearing bore of orbital driver arm 47 with arm 47 pivotably positioned between the lower first side of first alignment frame 31 and the idler gear 43.

Second alignment frame 33 also contains two upper aligned bearing bores and two lower aligned bearing bores through its two sides. The second half of idler shaft 45 is journaled through the two lower bearing bores with the idler gear 44 positioned between the two second alignment frame 33 sides. Output shaft 50, also positioned at the mechanism central axis 2, is journaled through the two second alignment frame 33 upper bearing bores with the output transfer gear 48 attached to it, positioned between the two frames 33 sides, and connected in a driven relation with the idler gear 44.

OPERATION OF THE INVENTION

Transmission

During operation of the CEPIV transmission of FIGS. 1 and 2, the driving motor rotates the CE drive gear 23 and attached CE actuator 25 through the CV universal joint 30 and input shaft 1. The input transfer gear 3, input receiving gear 5, transfer gear 7 and driver gear 9 accelerate the driver shaft 11, sliding actuator 15, driver arm 18, actuator linkage 9, and orbital driver 34 to a rotational speed which is faster than the speed of the CE drive gear 23.

With user-actuated movement of the control fork 17 positioning the sliding actuator 15, actuator linkage 19, orbital driver 34 and the CE drive gear 23 to its fully angled tilt position as depicted in FIG. 1, the transmission is actuated into its geared-neutral configuration.

During CEPIV transmission operation in the geared-neutral configuration, CV universal joint 32 and telescoping transfer shaft 39 are positioned at the mechanism central axis 2 in alignment with the input shaft 1 and output shaft 50. This precludes the output receiving gear 27 from orbiting the central axis, but permits its convolution when circumrevolved by the engaged tilted CE drive gear 23. However, should an integrated, torque converting, output reversing capability be desired, the geared-neutral configuration is modified to occur at a partial rather than full tilt of the CE drive gear 23. This modified configuration is established by the ratio of conditioning gearing 3, 5, 7, and 9. At this modified geared-neutral configuration, the output receiving gear 27 now conducts partial orbiting of the mechanism central axis 2. Further tilting of the CE drive gear 23 beyond this geared-neutral configuration will cause the output receiving gear speed as driven by the Coronel effect to exceed the rotational speed of the CE drive gear and produce a progressive, torque converting, output receiving gear 27 rotational speed in an opposite reversed direction. Maximum reversed speed using this modified configuration will occur with the CE drive gear 23 at full tilt and the output receiving gear 27 aligned with the mechanism central axis 2.

The alignment shaft 41 projects from the end of the output receiving gear 27 and is journaled through the bearing bore of the rotatable aligner disk 42. Aligner disk 42 freely rotates upon bearings 38 as driven by the circling alignment shaft 41. This compels the CE drive gear 23 to maintain driving contact with the output receiving gear 27 as CE drive gear 23 circumrevolves it.

During this circumrevolving driving, the tilted angle of CE drive gear 23 is driven around the engaged output receiving gear 27 by the orbital driver 34. This circumrevolving driving action is different and separate from rotational driving by the CE drive gear 23. The circumrevolving driving induces the output receiving gear 27 to counterrotate in a direction opposite from the orbiting direction of (1) the orbital driver 34, and (2) the circumrevolving driving direction of the tilted CE drive gear 23. The resulting circumrevolved induced counterrotation of the output receiving gear 27 is the "Coronel Effect."

The central axis of the CE drive gear 23 maintains a parallel relationship with the central axis of the CE drive gear 23 during all operational configurations. At the geared-neutral operational configuration, it convolutes about mechanism central axis 2 without rotating during concurrent CE drive gear circumrevolving and rotation.

Geared-neutral is achieved when output receiving gear 27 counterrotation ("Coronel Effect") is cancelled by direct rotation of the CE drive gear 23 through the input shaft 1 and CV universal joint 30. The ratios of all incorporated gearing are designed to achieve this CE drive gear 23 rotation cancellation of its concurrently generated circumrevolved "Coronel Effect" at the geared-neutral configuration.

During torque converting actuation of the CEPIV transmission output, movement of control fork 17 slides sliding actuator 15 towards driver gear 9. This motion is transferred to the orbital driver 34 through actuator linkage 19, reducing the tilt of the concurrently circumrevolving and rotating CE drive gear 23.

Reduction of CE drive gear 23 tilt moves output receiving gear 27 and CV universal joint 32 away from the mechanism central axis 2, commencing their orbiting of it. The initial reduction of the CE drive gear 23 tilt angle combined with initial orbiting of the output receiving gear 27 reduces the degree of CE drive gear 23 circumrevolving and the amount of its generated Coronel Effect. This induces output receiving gear 27 rotation as it orbitally drives into the slower revolving CE drive gear 23. These rotational products are transferred to the output shaft 50 through the telescoping transfer shaft 39 and CV universal joints 32 & 51.

Further decreases of the CE drive gear 23 tilt angle increase the size of output receiving gear 27 orbits around mechanism central axis 2. This results with further reductions of the generated Coronel Effect and the acceleration of transmission output speed. Full output speed is obtained when the CE drive gear 23 tilt angle is reduced to a perpendicular relationship with central axis 2, and the orbiting of the output receiving gear 27 is increased to its maximum. This completely cancels the Coronel Effect as the output receiving gear 27 is now fully orbiting into the slower revolving CE drive gear 23.

Geared Rotary Driver

During operation of the optional geared rotary driver of FIGS. 3, 4 and 5, the first alignment frame 31 is pivotally attached to the transmission's driver arm 20 of FIG. 6 with alignment support 37 journaled through the driver arm 20 slot. The second alignment frame 33 is connected to the first alignment frame 31 on one end with the journaled idler shaft 45, and connected to the output shaft on its second end. Pivot pin 49, attached to the second end of orbital driver arm 47, extends through and moves within the bearing slot of the angular extension 21 extending from driver arm 20 during speed change actuation. Pivot pin 49 compels (1) the geared rotary driver to orbit the mechanism central axis with driver arm 20, and (2) concurrent orbiting of both alignment frames 31 & 33 during all operational configurations.

During geared rotary driver operation within the transmission's geared-neutral configuration, idler gears 43 and 44 rotate around the transfer gear 40 and output transfer gear 48 as depicted in FIG. 3 without transferring any transmission output products.

During geared rotary driver operation with transmission production of rotational output, the telescoping transfer shaft 39 moves out of alignment from the output shaft 50 as depicted in FIG. 4. This pivots the first alignment frame's 31 top end away from the top end of second alignment frame 33 with the idler shaft 45 functioning as their pivot hinge.

During transmission production of output, idler gears 43 and 44 continue to rotate around the transfer gear 40 and output transfer gear 48. However, transmission output now rotating transfer gear 40 through the telescoping transfer shaft 39 modifies the rotational speed of idler gears 43 and 44 to drive output transfer gear 48 and the attached output shaft 50, producing mechanism output.

During transmission speed change actuation, changes in alignment between two alignment frames 31 and 33 will produce a few degrees modification of the transfer gears 43 & 44, output transfer gear 48, and attached output shaft 50 rotation. As much greater amounts of rotational motion will be transmitted through these components during speed changes, the effect upon DCPIV output from alignment modifications will be very slight and negligible for practical purposes.

INDUSTRIAL APPLICABILITY

The invention has applicability to most mechanical mechanisms which produce or utilize variable speed rotational motion. The prominent applications for the invention include: (1) replacement of conventional multi-step manual and hydraulic shifting transmissions to relieve their limitations of mechanical complexity, drive discontinuity, and adynamic ablative components; and (2) to open new industrial and vehicular applications for variable speed changing which are unable to utilize multi-step shifting transmissions but could benefit from this device.

Examples of existing applications the invention will replace include all motorized vehicular, machine tool, and industrial drive transmissions. Examples of new applications the invention will manifest include aquatic, aviation, electric generation, pneumatic, and hydrostatic drive transmissions. The invention will replace processes now utilizing variations of input speed such as industrial and inorganic drilling and cutting equipment. This will permit the driving motors to operate at their maximum power generating speed with the transmission producing continuously engaged variation of drilling or cutting speed.

Fabrication of the invention is straight-forward utilizing existing trochilic designing and equipment employed for the production of conventional transmissions. The invention is controllable through either direct manual actuation or existing computer-controlled electrical-mechanical servomotor interfaces.

I claim the invention and all variations or modifications which are within the scope of the following claims:

1. A process for utilizing a tiltable first gear to drive a second gear engaged to the first gear in a drive arrangement having an input shaft, an input stage, a set of conditioning gears, an output shaft, an output stage, a central axis defined by the input shaft and the output shaft, said first gear comprising a rotatable beveled tiltable drive gear, said second gear comprising an output receiving gear, an orbital driver, an output universally positionable connecting linkage, the process comprising:

revolving said first gear around the circumference of said second gear;

transforming the circumferential difference between said first gear and said second gear to the second gear rotation;

translating rotation of said input shaft with the set of conditioning gears to concurrently revolve and rotate said first tilting drive gear through said orbital driver;

changing the rotation of said output stage to a neutral gear position by revolving the axis of said tiltable first drive gear about the output receiving gear position at a maximum intersected angle to the central axis wherein the axis of said tiltable first drive gear intersects the central axis at a point;

continuously changing the rotation of said output stage from the neutral gear position to a predetermined maximum speed by reducing the angle of intersection of said tiltable first drive gear axis and the central axis;

converting the rotation of said output stage to said output shaft by said output linkage connected universally.

2. A gear train driving a second gear engaged to a first gear in a drive arrangement having an input shaft, an input stage, a set of conditioning gears, an output shaft, an output stage, a central axis defined by the input shaft and the output shaft, said first gear comprising a rotatable beveled tilting drive gear, said second gear comprising an output receiving gear, an orbital driver, an output universally positionable connecting linkage, comprising:

revolving means for revolving said first gear around the circumference of said second gear;

transforming means for transforming the circumferential difference between said first gear and said second gear to the second gear rotation;

translating means for translating the rotation of said input shaft with the set of conditioning gears to concurrently revolve and rotate said tilting first drive gear through said orbital driver;

changing means for changing the rotation of said output stage to a neutral gear position by revolving the axis of said tiltable first drive gear about the output receiving gear position at a maximum intersected angle to the central axis wherein the axis of said tiltable first dive gear intersects the central axis at a point;

continuously changing means to continuously change the rotation of said output stage from the neutral gear position to a predetermined maximum speed by reducing the angle of intersection of said tiltable first drive gear axis and the central axis;

converting means to convert the rotation of said output stage to said output shaft by said output linkage connected universally.

3. A gear train having an infinitely variable transmission producing and manipulating circumferential revolution with an input shaft, an output shaft and a central axis, including:

a tiltable first drive gear being tilted at an angle independently of driving gear rotation;

a smaller output receiving gear connected in a driven relationship with said tiltable first drive gear; wherein rotation of said tiltable first drive gear around the output receiving gear produces circumferential revolving of the output receiving gear independently of rotation of the driving gear;

said tiltable first drive gear connected to said input shaft with connecting means;

an output receiving gear connected to said tiltable first drive gear and said output shaft with an universally connected output linkage means;

a driver shaft connected to said input shaft with conditioning gearing;

an actuator means connected to said tiltable first drive gear for tilting said tiltable first drive gear with respect to the central axis;

an alignment means for aligning said tiltable first drive gear with the output receiving gear wherein the driver shaft revolves circumferentially, said tiltable first drive gear rotates faster than its rotational speed to produce a neutral gear position with the output receiving gear position in alignment at the central axis; and deployment of the actuator means for reducing the tilted angle of circumferential revolving to actuate torque converting mechanism output through the output receiving gear orbit around the central axis and into the slower revolving engaged tiltable first drive gear, continuously reducing the circumferential revolving to increase transmission output.

4. The transmission as claimed in claim 3 with the driver shaft is coupled upon the input shaft.

5. The transmission as claimed in claim 4 with an actuator means comprising an actuator sliding upon the driver shaft and connected to the orbital driver.

6. The transmission as claimed in claim 5 wherein the alignment means between the tilting drive gear and the output receiver gear includes an orbital driver with a first alignment means revolving the tilting drive gear on one end, and a second alignment means orbiting the output receiving gear.

7. The transmission as claimed in claim 6 wherein the alignment means between the tilting drive gear and output receiving gear includes an aligned disk rotating within the tilting drive gear upon bearing means and connected to the output receiver gear.

8. The transmission as claimed in claim 7 wherein the means for connecting the tilting drive gear to the input shaft, and the means for connecting the output receiving gear to the output universally positionable connecting linkage comprises constant velocity universal joints.

9. The transmission as claimed in claim 8 wherein the output universally positionable connecting linkage comprises a telescoping shaft with a first end connected to the output receiving gear with a universal joint, and a second end connected to the output shaft with a universal joint.

10. The transmission as claimed in claim 9 wherein the output universally positionable connecting linkage comprises a geared rotary driver.

11. The transmission as claimed in claim 10 wherein the connecting means between the transfer gear and the output receiving gear comprises a telescoping shaft.

12. The transmission as claimed in claim 11 wherein the alignment means between the orbital driver and the tilting drive gear, and the orbital driven and the output receiver gear, comprises one of driving forks and driving rings rotating upon bearing means.

13. The transmission as claimed in claim 12 wherein a counterbalancing means comprises a counterweight orbiting the central axis during all operational configurations.

14. The transmission as claimed in claim 13 wherein an integrated output system, including gear ratios establishing the neutral gear position at partially tilted first drive gear, where said tiltable first drive gear intersects the central axis at an angle greater than the angle of the axis of the neutral gear position, and causes the output receiving gear speed to produce a torque converting, progressively accelerating, opposite direction output receiving gear rotation, generating a bidirectional, infinitely variable transmission.

15. A geared rotary driver transmitting rotational motion from a concurrently rotating and orbiting output receiving gear to an output shaft, including:

an idler shaft with first and second idler gears orbiting the central axis at the orbital speed of the output receiving gear;

a transfer gear attached with a connecting means to the output receiving gear, connected in a driving relationship to the first idler gear, and aligned with a first alignment means;

an output transfer gear attached to the output shaft, connected in a driven relationship with the second idler gear, and aligned with a second alignment means, wherein variable output receiving gear and transfer gear rotation is transferred through the orbiting idler shaft and idler gears to the output transfer gear and the output shaft, and the first and second alignment means pivot at the idler shaft to accommodate variable output receiving gear and transfer gear orbiting of the mechanism central axis.

16. The geared rotary driver as claimed in claim 15 wherein the first and second alignment means respectively comprise individual frameworks, pivotally connected to one another, surrounding respective engaged gearsets, and bored to couple upper and lower shafts.

17. A geared rotary driver transmitting rotational motion as claimed in claim 15 wherein torque between an orbiting and rotating transmission shaft to an output shaft, including:

a first gear attached to said transmission shaft;

a means to position a second gear connected in a driven relation with the first gear and attached to a connecting shaft positioned at a right angle;

a fourth gear attached to said output shaft;

a means to position a third gear connected in a driving relation with the fourth gear at a right angle;

a means to reposition said third gear along the connecting shaft during transmission speed changes.

18. The transmission as claimed in claim 17 wherein a compensating counterbalance mechanism includes an orbiting counterweight linked with a connecting means to the drive gear tilting means to proportionally extend and retract said counterweight to continuously and proportionally counterbalance during transmission speed changes.

19. The transmission as claimed in claim 18 wherein a bearing shaft and mount are attached to one another with attachment means, sharing a contiguous central bore for coupling a component and supporting a majority of the operational component with means for attachment to the driving engine and supporting framework.

* * * * *

UNITED STATES PATENT AND TRADEMARK OFFICE
CERTIFICATE OF CORRECTION

PATENT NO. : 5,718,652
DATED : Feb. 17, 1998
INVENTOR(S) : Paul Kay Coronel

It is certified that error appears in the above-identified patent and that said Letters Patent is hereby corrected as shown below:

Column 3, line 14, should read: -- During operation of the CEPIV,--

Column 5, line 57, should read: -- 25. Coronel Effect Actuator --

Column 7, line 14, should read: -- The gear teeth of the output --

Column 8, lines 16 & 17, should read: --actuator linkage 19, --

Signed and Sealed this

Fifth Day of May, 1998

Attest:

BRUCE LEHMAN

Attesting Officer

Commissioner of Patents and Trademarks